June 28, 1960  W. H. KREMKOW  2,942,915
ADJUSTABLE TREAD WHEEL
Filed Sept. 19, 1955  2 Sheets-Sheet 1

INVENTOR.
WALTER H. KREMKOW
BY
ATTORNEYS

June 28, 1960 W. H. KREMKOW 2,942,915
ADJUSTABLE TREAD WHEEL
Filed Sept. 19, 1955 2 Sheets-Sheet 2

INVENTOR.
WALTER H. KREMKOW
BY
ATTORNEYS

United States Patent Office 2,942,915
Patented June 28, 1960

2,942,915

ADJUSTABLE TREAD WHEEL

Walter H. Kremkow, Livonia, Mich., assignor to Kelsey-Hayes Company, a corporation of Delaware Filed Sept. 19, 1955, Ser. No. 534,926

9 Claims. (Cl. 301—9)

The invention relates to wheels and refers more particularly to adjustable tread wheels for use with vehicles of the adjustable tread type.

The invention has for one of its objects to provide an improved wheel in which the wheel body and rim are rotatably adjustable relative to each other to vary the relative axial positions of the wheel body and rim to thereby make the wheel of the adjustable tread type.

The invention has for another object to provide a wheel having means for clamping a rim to a wheel body and for positively positioning the rim on the wheel body, without objectionable chording or radial distortion of the rim.

The invention has for a further object to provide a wheel in which the rim has rails formed with radially inwardly opening V-shaped notches with wedging surfaces and the wheel body has clamping means for the rails formed of members having wedging engagement with certain of the notches so that the radial load between the wheel body and rim is positively transmitted from the one to the other.

These and other objects of the invention will become apparent from the following description taken in connection with the accompanying drawings in which—

Figure 1:
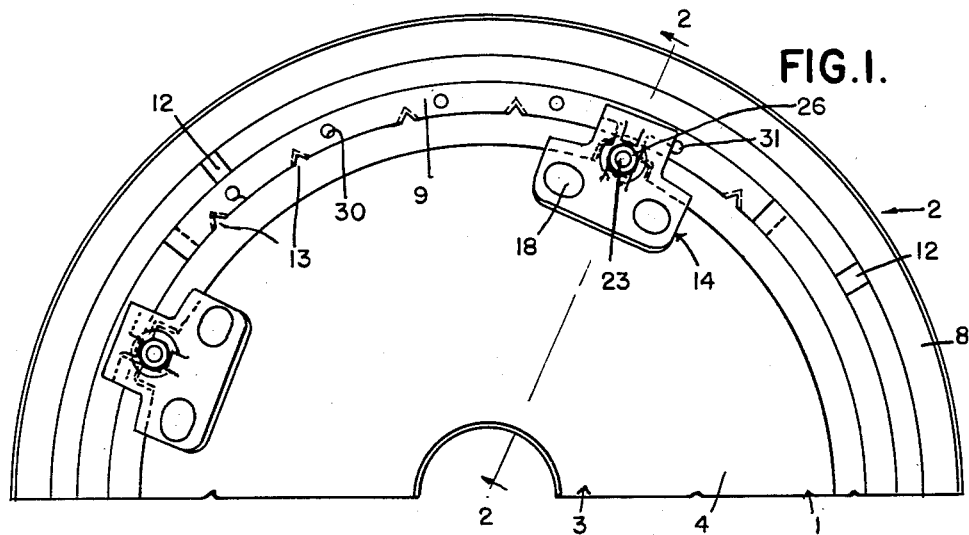
Figure 1 is an outboard elevation of a wheel embodying the invention.
Figure 4:
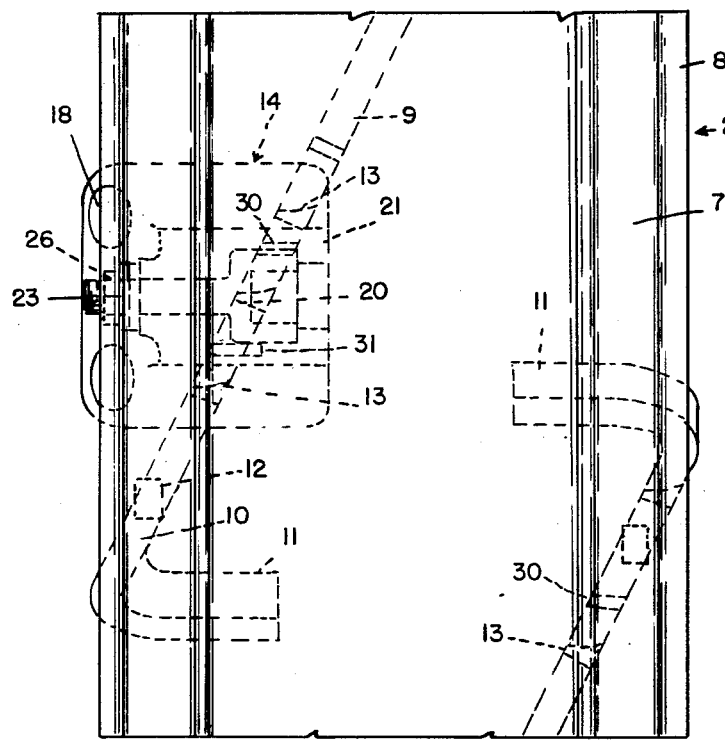
Figure 4 is an edge elevation of a portion of the wheel.

The vehicle wheel, in general, is a driven rear wheel of a vehicle and comprises the wheel body 1 and the tire rim 2 rotatably adjustably mounted on the periphery of the wheel body to vary the relative axial positions of the wheel body and rim to form an adjustable tread wheel. The wheel body, as shown, is a disk having the mounting portion 3 for attachment to a hub, the disk portion 4 and the peripheral flange 5 on which latter is mounted the rim 2. The rim, as shown, is a drop-center rim having the central well 6, the bead seats 7 and the side or tire retaining flanges 8.

For the purpose of adjustably mounting the rim on the wheel body, I have provided guide means on the rim and cooperating clamping means on the wheel body engageable with the guide means. The guide means comprises the rails 9 of rectangular cross section, each having the body portion 10 and the transverse end portions 11. The rails are equally distributed circumferentially of the rim and are fixedly secured to the inner surface of the well 6 and the bead seats 7 of the rim preferably by welds, suitable spacers 12 being provided between the bead seats and the rails. The bodies 10 are straight in plan view and inclined to the axis of the rim at an obtuse angle and to the median plane of the rim at an oblique angle. Each of the rails has in its inner edge portion the V-shaped notches 13 which are preferably equally spaced from each other. These notches have wedging surfaces which are inclined axially outwardly and radially inwardly so that the larger ends of the notches are at the axially inner sides of the rails.

Figure 2:
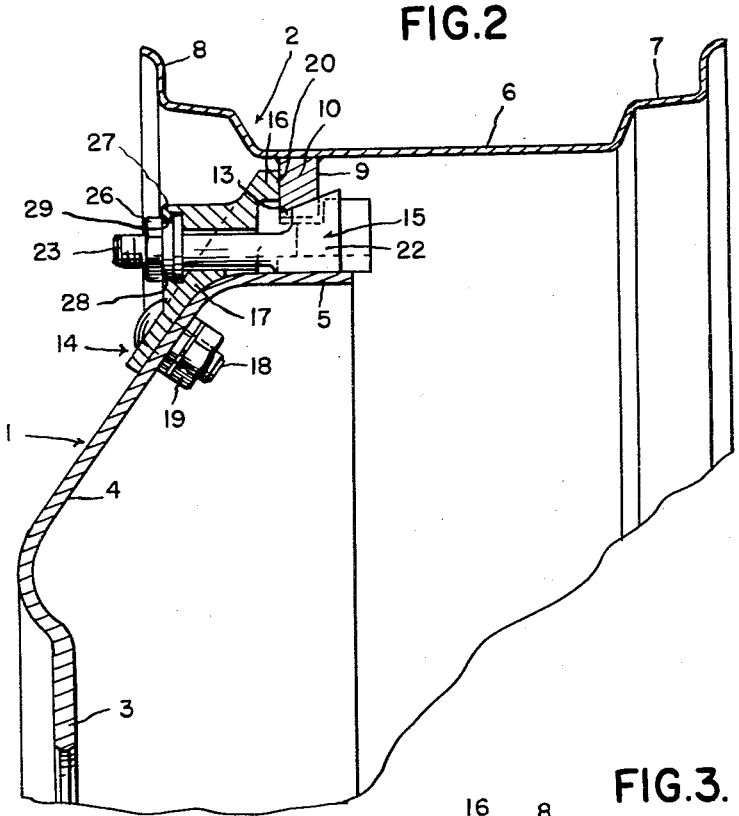
Figure 2 is a cross section on the line 2—2 of Figure 1.
Figure 3:
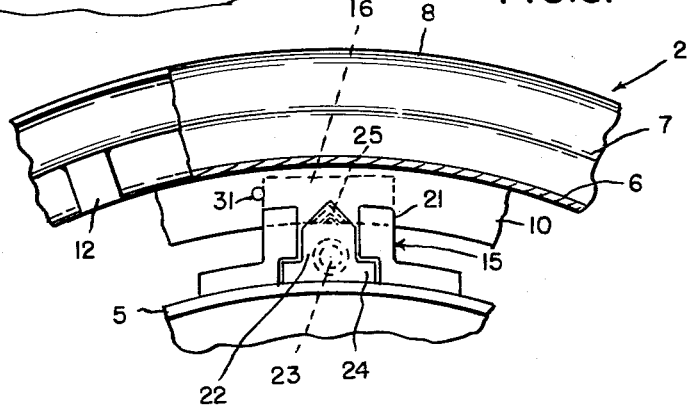
Figure 3 is an inboard elevation of a part of Figure 2.

The cooperating clamping means comprises the clamping lugs 14 and the clamps 15 engageable with each rail. Each clamping lug has the body 16 supported on the radially outer surface of the peripheral flange 5 and the tongue 17 engaging the outboard side of the disk portion 4 and attachably secured thereto by means of the bolts 18 and the nuts 19. The body 16 is formed with the surface 20 inclined at the same angle as the body 10 of the associated rail and engageable with the axially outer side of this rail. The body is also formed with the circumferentially spaced side walls 21. The surface 20 of the body 16 and the side walls 21 cooperate to form a channel for receiving a rail (see Figs. 2 and 3). Each clamp 15 has the head 22 and the threaded shank 23. The head is guided between side walls 21 for axial sliding on the peripheral flange 5 and has the wings 24 extending into the undercut portions beneath the upper portions of the side walls 21 and slidably engaging and guided by the undercut portions (Fig. 3). The head also has the V-shaped radially outer portion 25, the surfaces of which are inclined at the same angle as the wedging surfaces of the notches 13. This V-shaped portion is engageable with the notches and, upon axially outward movement of the clamp by the nut 26 threaded on its shank, the V-shaped portion wedgingly engages a notch. As a result, the associated rail is clamped against the surface 20 and wedged radially outwardly to place the rim under tension. Furthermore, a solid connection is made between the peripheral flange of the wheel body and the rim so that the wheel body and rim are positively rotated in unison and the radial load between the wheel body and rim is effectively carried.

For the purpose of compelling the clamps to move axially of the wheel upon turning of the nuts, the bodies 16 of the clamping lugs 14 are provided with means cooperating with the nuts to hold the latter from axial movement upon rotation. More particularly, the bodies 16 are formed with the opposed upper and lower flanges 27 and 28, respectively, adapted to extend into the annular grooves 29 formed in the nuts. These flanges permit the nuts to be inserted into place by a circumferential movement when the clamps are located axially inwardly and to engage the shanks of the clamps when the latter are moved axially outwardly.

The construction of wheel is such that the relative adjustment of the wheel body and rim may be carried out without removing the wheel from the vehicle and while the wheel is in active load supporting position. To accomplish the adjustment of the wheel, the nuts 26 are turned to disengage the clamps 15 from the rails 10 after which the wheel body is rotated in the desired direction by the engine of the vehicle and relative to the rim until the desired adjustment is made. Then the nuts 26 are tightened to move the heads 22 of the clamps 15 into wedging engagement with the correct notches 13 of the rails.

For the purpose of selectively controlling the relative rotatable adjustment of the wheel body and rim, the rails 9 are formed with the equally spaced holes 30 in their body portions 10 for engagement by suitable removable shoulder pins 31 which are adapted to be engaged by the adjacent edges of the bodies 16 of the clamping lugs 14. The pins are in the form of elongated cylinders removably insertable in holes 30.

It is seen that the invention affords a variable tread wheel construction in which the rim is connected in a positively driven fashion to the wheel body by means of a direct keying action, but without objectionable radially outward distortion of the rim having a chording effect on the latter.

What I claim as my invention is:

1. In a vehicle wheel, a wheel body, a rim, guide rails on the radially inner surface of said rim extending at an angle to the axis of said rim, said rails having circumferentially spaced radially inwardly opening V-shaped notches each formed with wedging surfaces inclined radially inwardly and axially outwardly, circumferentially spaced clamping lugs on said wheel body having surfaces inclined at the same angle as and engaging said rail, and circumferentially spaced clamps axially adjustably mounted on said wheel body having heads formed with V-shaped portions for engaging certain of said V-shaped notches and positively positioning said rim relative to said wheel body and clamping said rails against said surfaces of said clamping lugs.

2. In a vehicle wheel, a wheel body, a rim rotatably and axially shiftable with respect to said wheel body, guide rails on the radially inner surface of said rim extending at an acute angle to the median plane of said rim, said guide rails having circumferentially spaced radially inwardly opening V-shaped notches, clamps axially adjustable relative to said wheel body provided with heads having V-shaped portions wedgingly engageable with certain of said notches for positively positioning said rim relative to said wheel body, said heads transmitting radial load between said rim and wheel body, nuts threadedly engaging said clamps, and means on said clamping lugs for holding said nuts from axial movement in either direction.

3. In a vehicle wheel, a wheel body member, a rim member rotatably and axially shiftable relative to said body member, guide means on one of said members extending at an angle to the axis thereof, said guide means having circumferentially spaced radially inwardly opening V-shaped notches, and clamps carried by the other of said members provided with heads having V-shaped portions wedgingly engageable with certain of said notches for positively relatively positioning said rim and body members.

4. In a vehicle wheel, a wheel body, a rim rotatably and axially shiftable with respect to said wheel body, guide means on the radially inner surface of said rim extending at an angle to the axis of said rim and provided with circumferentially spaced, axially extending locking formations, clamping means on said wheel body guided by said means and comprising an axially movable clamping member having axial interlocking engagement with a formation of said guide means to positively position and clamp said rim in various positions of rotatable and axial adjustment relative to said wheel body, and means on said rim providing an abutment circumferentially engageable with said clamping member to positively position said clamping member in angular register with the formation engaged thereby.

5. In a vehicle wheel, a wheel body, a rim, guide rails on the radially inner surface of said rim extending at an angle to the axis of said rim and provided with circumferentially spaced, axially extending locking formations, circumferentially spaced clamping lugs on said wheel body having guiding surfaces engageable with said rails upon rotation of said wheel body relative to said rim, clamps carried by said respective clamping lugs axially adjustable relative to said wheel body into and out of wedging engagement with said formations of said rails, said clamps being movable in one direction to clamp said rails against said clamping lugs and being movable in the opposite direction to free said rails of clamping action, and means removably carried by one of said rails providing an abutment circumferentially engageable with one of said clamping lugs to positively position the associated clamp in angular register with a locking formation of a guide rail.

6. A vehicle wheel comprising a wheel body, a rim, a guide rail on said rim extending at an angle to the axis thereof, adjusting devices on said wheel body including means engageable with said guide rail to effect relative axial shifting of said rim and wheel body upon relative rotation thereof, a clamp axially adjustable relative thereto into and out of locking engagement with said guide rail, said guide rail having a plurality of locking formations for said clamp which are selectively engageable by the latter in selected adjusted positions of said rim and wheel body, and means adjustably carried by said guide rail providing an abutment circumferentially engageable with said clamp to positively register a selected locking formation in angular relation to said clamp.

7. In a vehicle wheel, a wheel body, a rim, guide rails on the radially inner surface of said rim extending at an angle to the axis of said rim, said rails having circumferentially spaced radially inwardly opening V-shaped notches, circumferentially spaced clamping lugs on said wheel body having surfaces inclined at the same angle as and engaging said rails, and circumferentially spaced clamps axially adjustably mounted on said wheel body having heads formed with V-shaped portions for engaging certain of said V-shaped notches and positively positioning said rim relative to said wheel body and clamping said rails against said surfaces of said clamping lugs.

8. In a vehicle wheel, a wheel body and a coaxial rim, rails on the radially inner surface of said rim extending at an angle to the axis of said rim, guide means on said wheel body coacting with said rails to render said rim adjustable axially relative to said wheel body upon relative rotation of said wheel body and rim, said rails having circumferentially spaced radially inwardly opening generally axially extending notches, and circumferentially spaced clamps axially adjustably mounted on said wheel body having heads formed with portions shaped to engage certain of said notches to positively position said rim relative to said wheel body.

9. In a vehicle wheel, a wheel body and a coaxial rim, rails on the radially inner surface of said rim extending at an angle to the axis of said rim, guide means on said wheel body coacting with said rails to render said rim adjustable axially relative to said wheel body upon relative rotation of said wheel body and rim, said rails having circumferentially spaced radially inwardly opening generally axially extending V-shaped notches each formed with wedging surfaces inclined radially inwardly and axially, and circumferentially spaced clamps axially adjustably mounted on said wheel body having heads formed with V-shaped portions each formed with wedging surfaces inclined radially inwardly and axially for wedging engagement with certain of said notches to positively position sadi rim relative to said wheel body.

References Cited in the file of this patent

UNITED STATES PATENTS

| | | |
|---|---|---|
| 2,161,351 | Hoffmann | June 6, 1939 |
| 2,417,139 | Strehlow | Mar. 11, 1947 |
| 2,432,385 | Court | Dec. 9, 1947 |
| 2,702,724 | Nordenson | Feb. 22, 1955 |
| 2,793,913 | Stough | May 28, 1957 |